(12) United States Patent
Allum

(10) Patent No.: US 6,801,078 B2
(45) Date of Patent: Oct. 5, 2004

(54) POWER EFFICIENT INTEGRATED CHARGE PUMP USING CLOCK GATING

(75) Inventor: Dean Allum, Monument, CO (US)

(73) Assignee: EM Microelectronic - Marin SA, Marin (CH)

( * ) Notice: Subject to any disclaimer, the term of this patent is extended or adjusted under 35 U.S.C. 154(b) by 0 days.

(21) Appl. No.: 10/468,453
(22) PCT Filed: Feb. 22, 2002
(86) PCT No.: PCT/EP02/01997
§ 371 (c)(1),
(2), (4) Date: Feb. 13, 2004
(87) PCT Pub. No.: WO02/069481
PCT Pub. Date: Sep. 6, 2002

(65) Prior Publication Data
US 2004/0124907 A1 Jul. 1, 2004

(30) Foreign Application Priority Data
Feb. 28, 2001 (EP) .............................. 01200753

(51) Int. Cl.[7] .............................................. G05F 1/10
(52) U.S. Cl. ........................................ 327/536; 363/59
(58) Field of Search ................................ 327/534, 536; 363/59

(56) References Cited

U.S. PATENT DOCUMENTS 5,159,543 A * 10/1992 Yamawaki .................. 363/60
5,479,090 A    12/1995 Schultz
5,561,385 A    10/1996 Choi
5,969,513 A    10/1999 Clark
6,157,243 A    12/2000 Tailliet
6,518,828 B2 * 2/2003 Seo et al. ................... 327/534

FOREIGN PATENT DOCUMENTS

EP    492 538 A2    7/1992
EP    655 827 A1    5/1995

OTHER PUBLICATIONS

On Chip High Voltage Generation In NMOS Integrated Circuits Using An Improved Voltage Multiplier Technique, by John F. Dickson, IEEE Journal of Solid State Circuits, vol. SC 11, No. 3, pp. 374–378, Jun. 1976.

* cited by examiner

Primary Examiner—Terry D. Cunningham
(74) Attorney, Agent, or Firm—Sughrue Mion, PLLC

(57) ABSTRACT

A voltage multiplier circuit in particular for programmable memories is supplied by a low voltage. This circuit includes an oscillator which generates a clock signal and a charge pump circuit controlled by the clock signal. The charge pump boosts a DC supply voltage to a high voltage which is looped back to a voltage feedback regulator. A multiplexer which is placed between the oscillator and the charge pump, receives a gating signal from the regulator which depends on the comparison of the high output voltage to a determined regulation voltage.

12 Claims, 8 Drawing Sheets

POWER EFFICIENT INTEGRATED CHARGE PUMP USING CLOCK GATING

FIELD OF THE INVENTION

The present invention generally relates to reducing current consumption in voltage multiplier circuits used for programmable memories, and more particularly to an integrated circuit including an oscillator for generating a clock signal, a charge pump circuit controlled on the basis of the clock signal in order to generate a high voltage for programming memories and a regulation feedback loop for controlling the high voltage level. The feedback loop includes a feedback circuit connected to the output of the charge pump circuit and a means for gating the clock signal, which is disposed in the feedback loop between the oscillator and the charge pump circuit, the means being controlled by a gating signal supplied by the feedback circuit. The feedback circuit comprises means for generating, on the basis of the high output voltage, an intermediate control voltage which varies within a determined voltage range defined by minimum and maximum voltage levels.

DESCRIPTION OF THE RELATED ART

In the prior art, as illustrated in FIG. 1, the document U.S. Pat. No. 6,157,243 discloses a high voltage generation circuit including an oscillator 1 that outputs two clock signals Phi and Phib in phase opposition that are used by a charge pump circuit 2. This charge pump circuit 2 outputs a high voltage HV. This high voltage is used by circuitry 4 for programming or erasing a non-volatile memory. This high voltage HV is also supplied to a regulation circuit 3 that outputs a control signal Run. This control signal Run is supplied to an enabling input En of the oscillator 1.

The oscillator has a stage 5 for generating a clock signal CLK. The output S1 of this stage 5 is looped to its input E1 through a NAND-type logic gate 6. At another input this logic gate 6 receives the control signal Run that is supplied to the enabling input En of the oscillator 1. The output of the logic gate 6 that is relied to the input E1 of the stage 5 supplies a first inverter 7 followed in series with a second inverter 8 that outputs of said inverters deliver the two clock signals Phi and Phib in phase opposition.

The regulation circuit 3 includes a Zener diode 9 and a resistor 10 series-connected between the high output voltage HV of the charge pump circuit 2 and ground. An inverter 11, whose input is connected to a connection point P between the diode 9 and the resistor 10, outputs the control signal Run. The Zener diode 9 has a Zener voltage equal to 18 Volts. It is the Zener voltage which gives the reference voltage level Vref for the regulation circuit 3.

When the high voltage HV exceeds this reference voltage Vref of 18 Volts, the current in the diode 9 increases and the voltage at the connection point P tends to rise. At the output of the inverter 11 of the regulation circuit 3, the control signal Run therefore goes to 0. This deactivates the oscillator 1. This deactivation corresponds to the freezing of the clock signals Phi and Phib, which remain in a given state. The charge pump circuit 2 therefore no longer operates. The level of the output voltage HV will then gradually fall, either because of current leakages or because of the activation of a circuit 4 for programming the memory.

When the high voltage HV is lower than the reference voltage Vref, the current in the arm of the regulation circuit 3 is very low and the voltage at the connection point P is close to zero. The control signal Run then goes to 1. This activates the oscillator, and the output level of the charge pump circuit 2 will rise again. This type of regulation of the charge pump circuit is called the "go-no-go" mode of regulation.

The solution according to U.S. Pat. No. 6,157,243 presents some drawbacks. The control signal Run is directly determined by the comparison between the output voltage HV and the reference voltage Vref. Therefore, when the output voltage is close to the reference voltage, the high voltage generation circuit oscillates due to the constant activation and deactivation of the oscillator 1 and consequently of the charge pump circuit 2. This results in an increased power consumption and in increase of the noises, such as supply and ground noises. Further, the activation and deactivation of the oscillator 1 introduces transition clock modes that can affect the efficiency of the charge pump circuit 2.

In another prior art, as illustrated in FIG. 2, the document EP 0 655 827 also discloses a high voltage generation circuit comprising a classical charge pump circuit 21, a clamp circuit 22, a voltage detecting circuit 23 and a clock control circuit 24.

The clamp circuit includes a PMOS transistor 25 having its gate connected to the supply voltage Vdd and its source electrode connected to the high output voltage HV, and an NMOS transistor 26 having its drain connected to the drain of the PMOS 25, its gate connected to the supply voltage Vdd and its source electrode connected to ground.

The voltage detecting circuit 23 is composed of an inverter 27 having an input connected to a connection node B between the PMOS 25 and the NMOS 26 transistors.

The clock control circuit 24 has a NAND gate 28 having one input connected to an external clock, e.g. an oscillator 29, and the other input connected to an output line D of the inverter 27. An output of the NAND gate 28 is connected to the clock input terminal of the charge pump circuit 21.

The above described circuit works as follows. When a pump-up operation is started, since the high output voltage HV is lower than a predetermined regulation voltage, the PMOS 25 in the clamp circuit 22 is off, and therefore, the node B is pulled down by the NMOS 26. Since a voltage VB on the node B is at a low level, the output D of the inverter 27 is at a high level, and therefore, the clock signal supplied to the external clock is supplied through the NAND gate 28 to the clock input terminal as an internal clock. Thus, the charge pump circuit 21 is put into operation, so that the electric charge is supplied to the high output voltage, and therefore, the high output voltage is rising up.

When the high output voltage HV reaches a clamp voltage Vcl (=Vdd+Vtp), where Vtp is the threshold voltage of the PMOS 25, the PMOS is turned on so that the potential VB on the node B is brought to a high level. Accordingly, the potential on the output line D of the inverter 27 becomes the low level (which constitutes a detection signal), and the output of the NAND gate 28 is brought to a high level.

Accordingly, the clock signal supplied to the external clock is not transmitted to the clock input terminal, and therefore, the charge pump circuit 21 stops its operation.

Incidentally, in the high voltage generating circuit, when the voltage elevation is completed and therefore when the charge pump circuit 21 is stopped, the elevation of the high output voltage HV stops in a first time and decreases after, so the PMOS 25 is turned off. Therefore, the potential VB on the node B is pulled down by the NMOS 26 and drops below a logical threshold level of the inverter 27.

Accordingly, the potential of the output of the line D of the inverter 27 is brought to the high level, so that the clock signal is supplied through the NAND gate 28 to the clock input terminal, and therefore, the charge pump circuit 21 starts its pumping-up operation again. As a result, the high output voltage HV elevates to the clamp voltage Vcl, and the voltage detection signal D is outputted again so as to stop the pumping-up operation of the charge pump circuit 21. These operations are repeated during each voltage elevation period.

The solution according to EP 0 655 827 also presents some drawbacks. The potential of the output of the line D of the inverter 27 controls the activation and deactivation of the charge pump circuit 21. The deactivation signal depends directly on the comparison between the high output voltage HV and the reference voltage, that corresponds to the clamping voltage Vcl. The voltage VB digitally jumps to the high level without any control on the slope of the voltage transition. The activation signal, which is decouple from this comparison depends on the characteristics of the inverter 27 and of the NMOS transistor 26. The voltage VB of the node B is pulled down through the NMOS 26 and therefore gradually lowers. Accordingly, the input of the inverter 27 is biased at an intermediate level for a long period of time, so that a pass-through current flows in the inverter. As a result, the consumed electric power is increased, and a voltage supply noise and ground noise are induced.

In order to reduce the period of time when the input of the inverter 27 is biased at an intermediate level, the transconductance factor gm of the NMOS 26 can be set to a larger value, so that the pulled-down of the potential Vb is speeded up. In this approach, however the activation and the deactivation of the charge pump circuit 21 are repeated at short intervals, and create oscillations close to the reference voltage Vcl in the same way that in the US above cited document of the prior art. This results in an increased consumed power and in increase of the noises.

SUMMARY OF THE INVENTION

The object of the present invention is to overcome the aforecited drawbacks of both prior arts and, in particular, to provide a voltage multiplier circuit with low current consumption and without oscillations around the determined regulation voltage.

These objects are achieved as a result of a voltage multiplier circuit as defined hereinbefore and characterized in that the minimum and maximum voltage levels are independent of said high output voltage and in that the means for generating the intermediate control voltage include control means for selectively and gradually increasing and decreasing the intermediate control voltage within said voltage range in response to the high output voltage being above or under a determined voltage level.

Then the current consumption is reduced by using feedback regulation of the output voltage with decoupled control over the gating signal in order to avoid oscillations of the multiplier circuit around the determined regulation voltage. Advantageously, the voltage feedback regulator also includes a stabilization capacitor to eliminate oscillations.

Another object of the present invention is to reduce perturbations due to noises such as supply and ground noises. The multiplier circuit is then characterized in that the gating signal is a digital signal having two different levels, a low and high level, and in that the feedback circuit further includes at its output digitizing means being an hysteresis trigger with two different threshold voltages which commands said both levels of said gating signal.

Another object of the present invention is to obtain a regulated high output voltage which is the closest to the determined regulation voltage. Then, the high output voltage is filtered by using a transistor with a low threshold voltage in order to limit output voltage variations.

Another object of the present invention is to increase the cycling endurance of the memory cells. Advantageously, the voltage feedback regulator includes furthermore, ramp rate control means. These means preferably comprise a capacitor and a transistor.

According to an embodiment of the invention, the means for gating the clock signal are a multiplexer supplied by a DC voltage. This multiplexer receives the clock signal generated by the oscillator which is multiplexed with the supply voltage. Multiplexing is controlled by the gating signal generated by the feedback circuit in order to let one pass.

BRIEF DESCRIPTION OF THE DRAWINGS

Other features and advantages of the invention will appear from the following description of particular embodiments of the invention, given by way of non-limiting examples, with reference to the annexed drawings, in which.

DETAILED DESCRIPTION OF THE PREFERRED EMBODIMENTS

Figure 1:
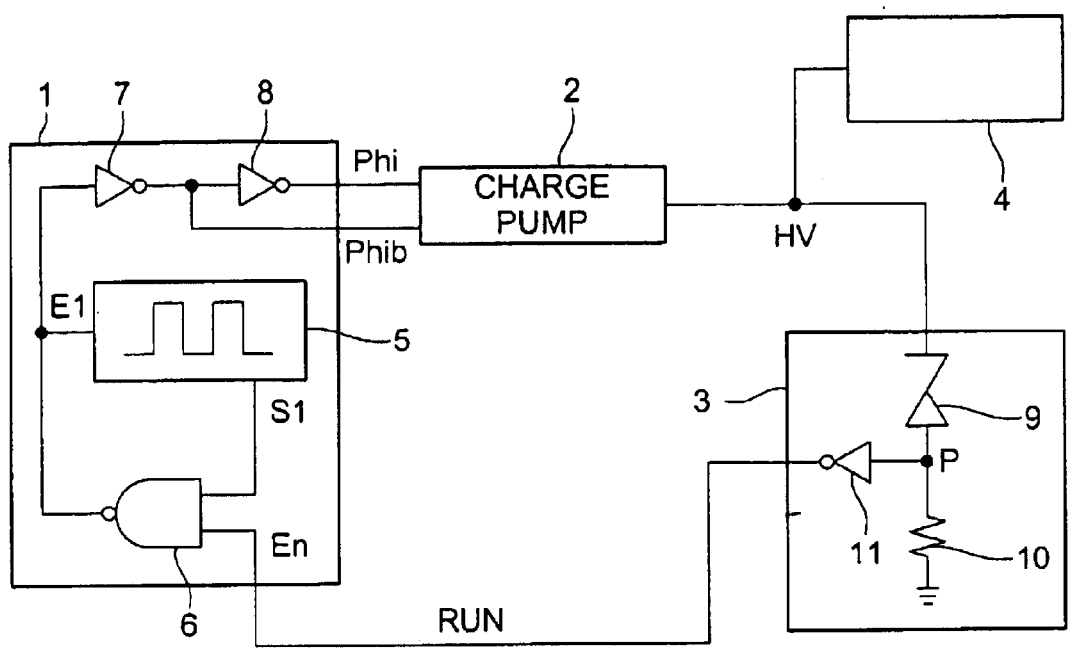
FIG. 1, is a block diagram of a voltage multiplier circuit according to the prior art.
Figure 2:
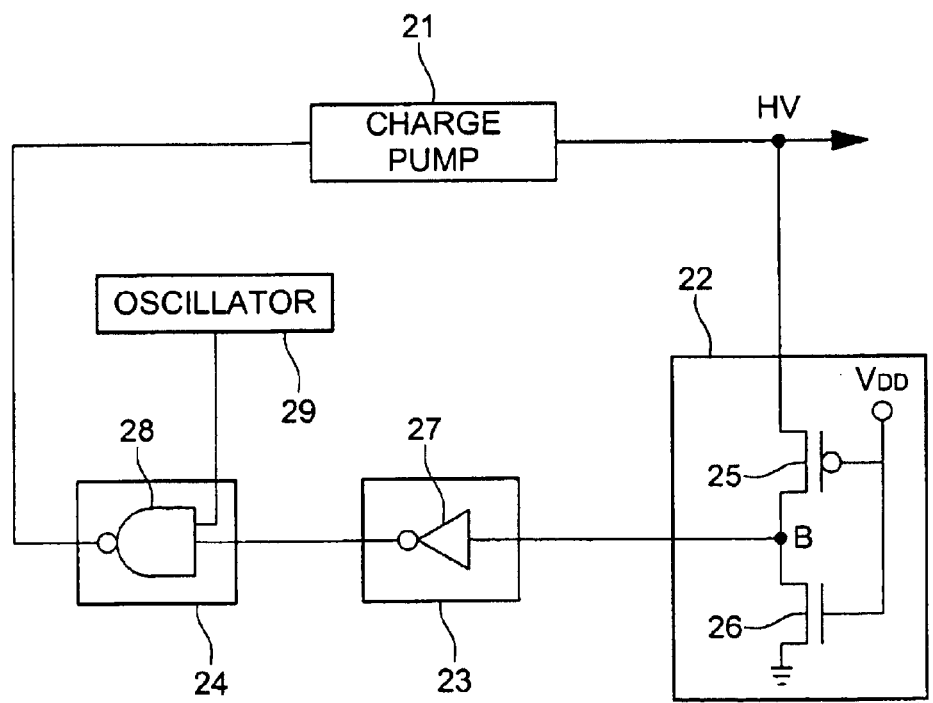
FIG. 2, is a block diagram of a voltage multiplier circuit according to another prior art embodiment.

FIGS. 1 and 2 have already been described in relation to the prior art.

Figure 3:
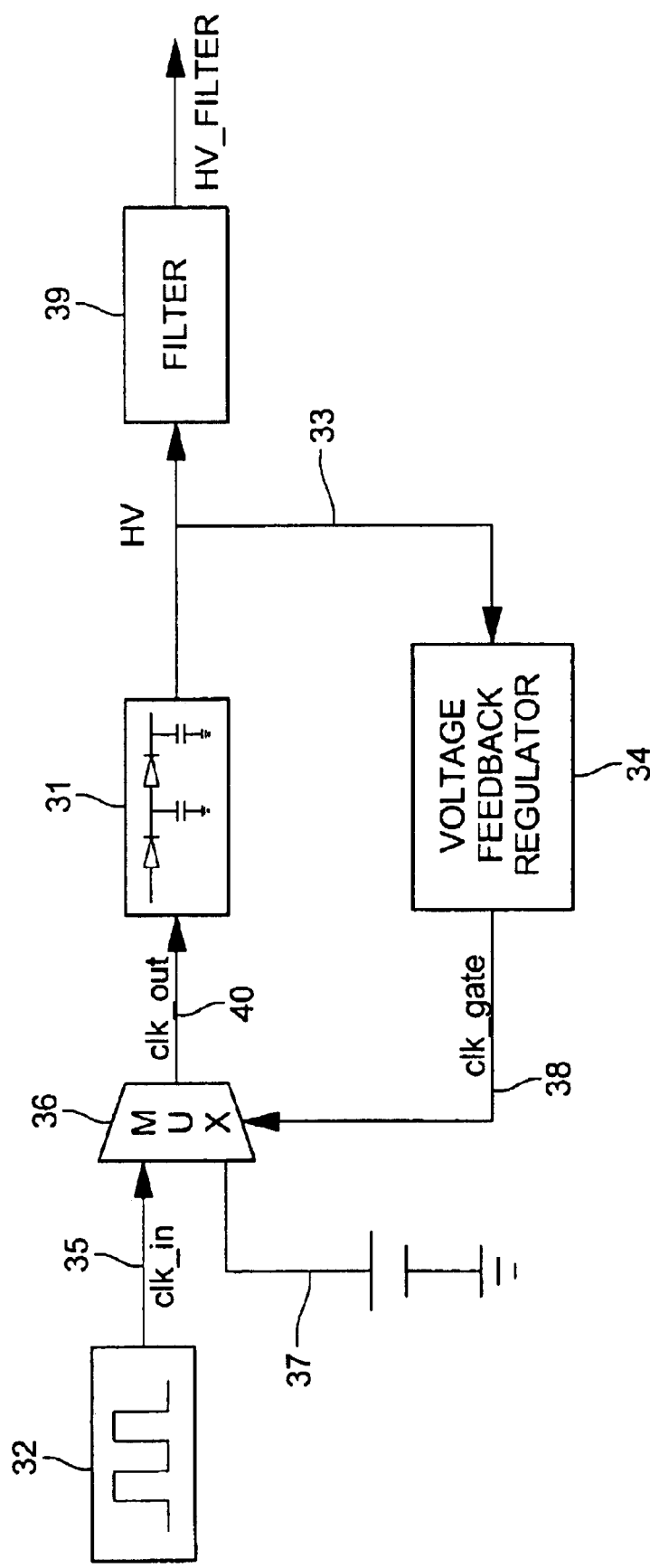
FIG. 3, is a block diagram of a voltage multiplier circuit according to the invention.

FIG. 3 shows a voltage multiplier circuit with a feedback control according to the invention. Typically such a circuit is supplied by a low voltage generator. The different elements of the circuit need to be supplied by such a generator.

A conventional charge pump 31 is used to elevate the DC supply voltage to a determined high output regulation voltage Vreg. An oscillator 32 generates a clock signal clk_in that can be conventionally transformed into biphased or quadriphased clock signals (see FIG. 9). A regulation feedback loop 33 including a voltage feedback regulator 34 controls the output voltage HV by gating the clock signal 35 delivered by the oscillator 32. Other feedback circuits could be used, such as a current feedback regulator.

To achieve the clock gating, means for gating the clock signal, such as a multiplexer 36, are placed between the oscillator 32 and the charge pump 31. This multiplexer 36 receives at its input the clk_in signal 35 and a DC supply voltage 37. The voltage feedback regulator 34 controls the multiplexing by sending a gating signal 38 referenced clk_gate to the MUX 36. This clk_gate signal 38 is preferably a digital signal with two different levels. One level commands the output voltage HV to be pumped up, and the other level commands the output voltage HV not to be pumped up. Changing levels are controlled by the voltage feedback regulator 34 which compares the output voltage HV to a determined regulation voltage Vreg. The detailed structure of the feedback circuit will be studied more carefully with reference to FIGS. 5 and 7.

At the output of the voltage multiplier circuit a filter 39 is added to eliminate oscillations of the output voltage HV. The resulting voltage is a DC high voltage HV_FILTER supplying the memory programmable cells which will not deteriorate. Such a filter usually includes a low threshold transistor and a real or parasitic capacitor to regulate the output current. Such a capacitor consumes very little current.

Figure 4:
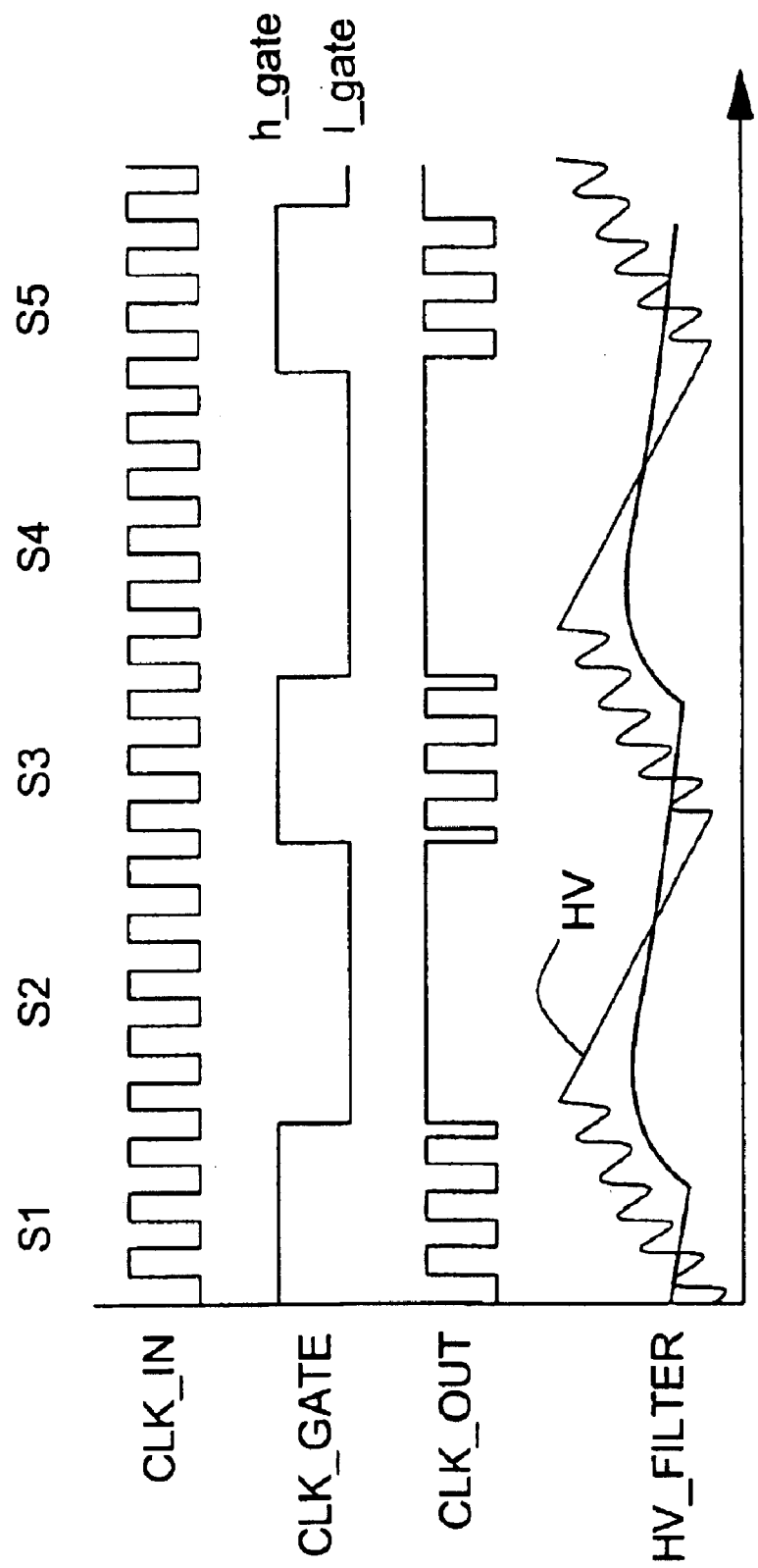
FIG. 4 shows the evolution of the high output voltage as a function of the multiplexed signal, according to FIG. 3.

FIG. 4 shows the influence of gating the clock on the output voltage HV.

The clk_in signal 35 is the signal generated by the oscillator 32.

The clk_gate signal 38 is the gating signal generated by the voltage feedback regulator 34. This clk_gate signal has two different levels, a high level referenced h_gate and a low level referenced l_gate. The l_gate level corresponds to an output voltage HV which does not require pumping up. The h_gate level corresponds to an output voltage HV which requires pumping up. It is also conceivable to command the charge pump with reversed gating signals.

The clk_out signal 40 is the multiplexed signal generated by the MUX 36. It corresponds to the clk_in signal 35 when the clk_gate signal 38 is at the h_gate level and then activates the charge pump circuit. And it corresponds to an uninterrupted high level of the clk_in signal when the clk_gate signal is at the l_gate level. In this last case, the clock is "gated off" and then the charge pump circuit is deactivated.

The HV signal represents the variation in the output voltage HV of the voltage multiplier circuit after the start-up period of the charge pump. The determined regulation voltage Vreg has already been reached at least once. So, the circuit is in its regulation mode, when it is really power efficient.

The HV_FILTER signal represents the output voltage after it has been filtered. The loss of amplitude is due to the threshold voltage of the transistor included in the filter 39.

Odd sections S1, S3 and S5 represent the pumping sections which are short. And even sections S2 and S4 represent the gated sections which are long. During the odd sections S1, S3 and S5, the charge pump 31 is pumping up the output voltage HV. So, there is no current saving. The pumping capacitors of the charge pump are successively charged and discharged when the clk_out signal 40 respectively switches from high-to-low transition and from low-to-high transition. Thus, the output voltage HV is pumped up. During the even sections S2 and S4, the storage capacitors only discharge at a rate determined by the high voltage load. So, the output voltage HV goes down and the current consumption is lowered. Further, in case of the FIG. 9 embodiment which uses a biphase or quadriphase clock, during clock gated sections, the used inverters are not solicited with clock pulses. Thus, the current consumption is reduced even further.

For example, the current consumption of a conventional charge pump is approximately 300 µA with a 3 Volt supply voltage. When using the same charge pump according to the invention circuit the current consumption is lowered to 25 µA.

Even further consumption reduction is possible with the implementation of a lower current RC oscillator. Simulation indicates that current consumption can be reduced to less than 5 µA. Such an implementation is technically realizable because of the independency of the oscillator with respect to the feedback loop.

Figure 5:
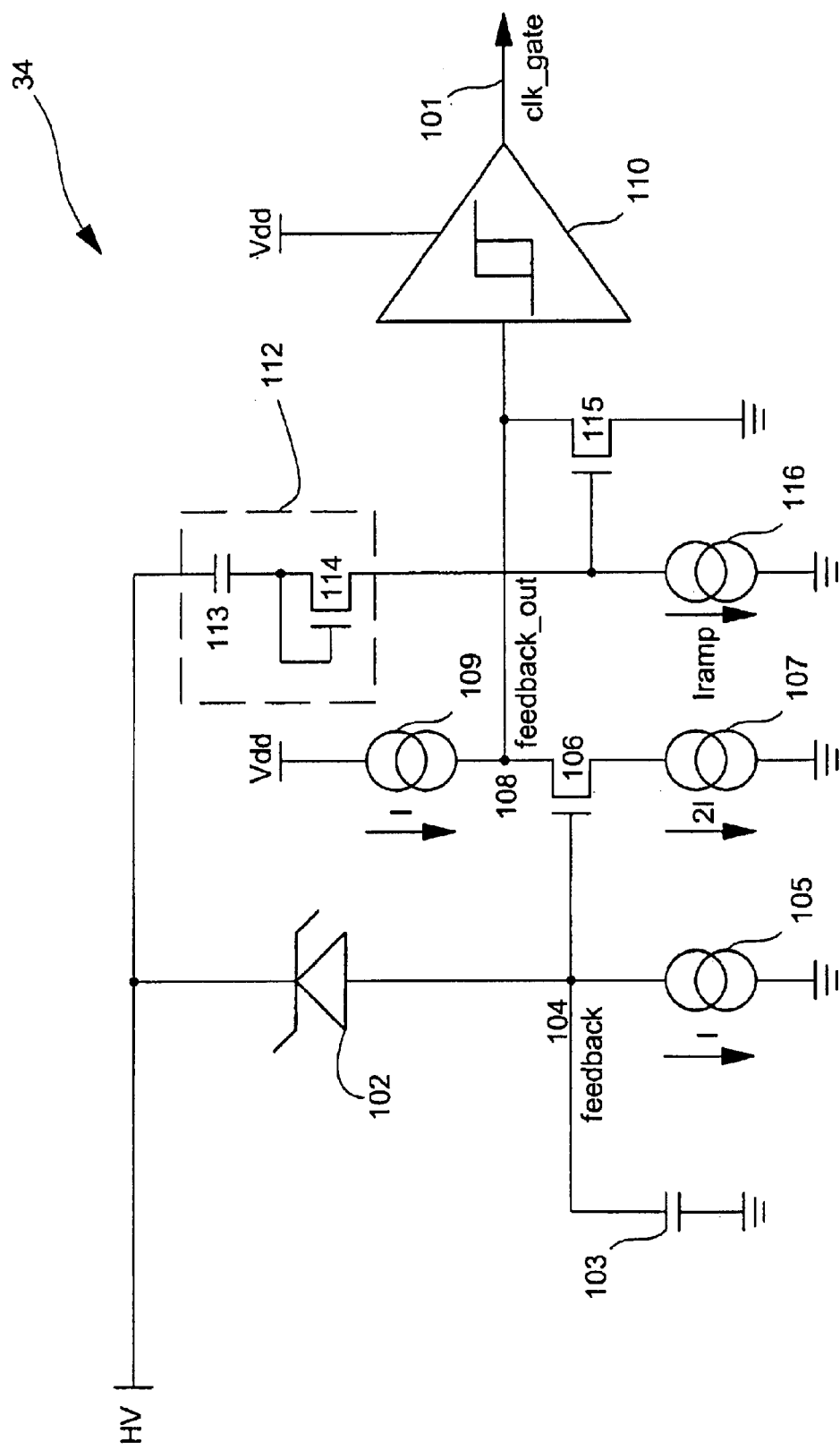
FIG. 5, is a simplified schematic diagram of the voltage feedback regulator according to the invention.

FIG. 5 shows a simplified schematic diagram of the voltage feedback regulator according to a preferred embodiment of the invention. The role of the voltage feedback regulator is to transform the output voltage information into a digital command 101 referenced clk_gate transmitted to the multiplexer which is not shown. To achieve this transformation, the regulator action is divided into several steps.

The first step is associated with voltage dropping means. The aim of these voltage dropping means is to reduce the high output voltage HV to a lower voltage. In the embodiment shown, the means are a Zener diode 102 which is used to pull down HV. But, it is possible to add some voltage dropping transistors to decrease HV a little further. A combination of a Zener diode and transistors of specific size can be used to control the temperature dependence of the high voltage regulation. Thus, the resulting voltage Vfeedback of the feedback node 104 is roughly equal to zero during start-up of the charge pump until HV reaches a higher voltage than the dropping voltage amplitude and after Vfeedback voltage is a down level shifted copy of HV voltage. The dropping amplitude depends on the Zener diode 102 and if so on the added dropping transistors, which are not shown.

HV voltage is about 15 Volts and Vfeedback voltage has to be of the order of 1 Volt. So the dropped voltage has to be about 14 Volts.

This feedback node 104 is also linked to a current sink 105 which consumes a specific small current I. Finally, the feedback node 104 is used for switching means, such as NMOS transistor 106, having a threshold voltage Vt which corresponds to the dropped determined regulation voltage Vreg, typically of 0.8 Volt. Thus, the threshold voltage Vt of the switching means added to the dropped voltage is equal to the determined regulation voltage Vreg.

The purpose of the feedback node 104 is to control the state of the switching transistor 106 with the variation in its potential Vfeedback. If Vfeedback is higher than the threshold voltage of the switching transistor 106, the transistor is in a conductive state. And if Vfeedback is lower than the threshold voltage of the switching transistor 106, the transistor is in a non conductive state.

The source electrode of said switching transistor 106 is connected to a current sink 107 which consumes a current 2I which is twice as large as the feedback node current sink 105. The ratio between these two current sinks is obtained by using current mirrors. The detailed structure will be given in FIG. 7. The arrangement of elements 109, 106 and 107 are forming control means which allow equal voltage rise and fall times of node 108 determined by current I and the capacitive load of the digitizing means 110. These controlled rise and fall times prevent oscillations in the feedback loop.

More generally, the ratio between these two currents sinks is chosen in order to have the best compromise between preventing oscillations in the feedback loop and having the shortest time to react. For example, the selected ratio of 2 has given good results.

The drain electrode of the switching transistor 106 corresponds to the feedback_out node 108, where an intermediate control voltage Vfeddback_out is supplied. This node 108 is also supplied by a current source 109 which delivers the same current I as the feedback node current sink 105 consumed. Further, the feedback_out node 108 is linked to the input of digitizing means 110. Said means 110 and the current source 109 of the feedback_out node are both supplied by an DC voltage Vdd, typically of 3 Volts. The purpose of the feedback_out node 108 is to control the digitizing means 110 with the variation in its potential (Vfeedback_out).

The digitizing means is typically a hysteresis trigger 110 which has two different threshold voltages to generate both the high and low levels of the digital output signal 101 called clk_gate. These two threshold voltages are, for example, about 0.9 Volt and 1.7 Volts. They could be adjusted to desired values by modifying transistor sizes comprised in the trigger. When the input voltage corresponding to the feedback_out potential decreases lower than 0.9 Volts then the clk_gate signal 101 changes levels from the high to low level (see FIG. 6A). When the feedback_out potential increases higher than 1.7 Volts the clk_gate signal 101 also changes level from the low to high level.

It is important to note that the digitizing means are controlled by the feedback_out potential which is decoupled from the feedback potential which means that the feedback_out potential is independent from the feedback potential.

The clk_gate signal 101 generated by the trigger 110 controls the MUX.

Some ramp rate control means 112 can be inserted between the feedback_out node 108 and the input of the trigger 110. These means 112 are preferably a capacitor 113 connected in series with a transistor 114. The added transistor 114 allows the determined output regulation voltage Vreg to be reached sooner than ramp rate control means that comprises only a capacitor. So the effective programming time of the memory is increased.

Thus, ramp rate control means currently regulate the output voltage when the charge pump starts up. In this case, the ramp rate control means are inefficient while the added transistor 114 is in a non conductive state. The state of this transistor is determined by its threshold voltage. This threshold voltage is chosen in such a manner that the output voltage is not controlled before reaching 6 Volts.

Both elements 113 and 114 determine the potential of the gate of a control transistor 115. This control transistor 115 pulls down Vfeedback_out when it is in a conductive state and leaves it unchanged when it is in a non conductive state. Thus, the ramp rate control means 112 are efficient until HV reaches regulation voltage Vreg. A current sink 116 is placed at the gate of the control transistor 115 to regulate the current at this node.

Figure 6A:
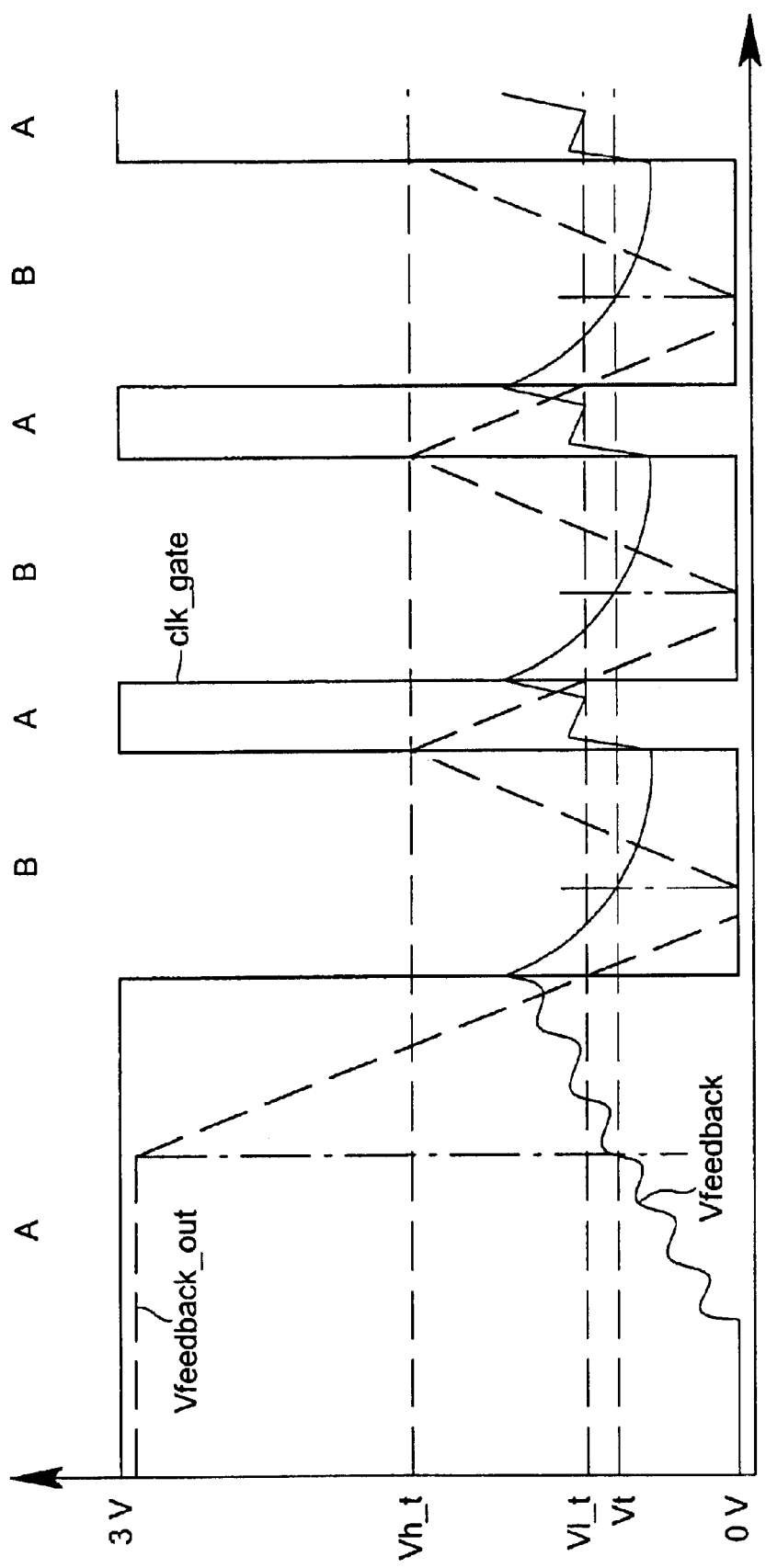
FIG. 6A, is the evolution of the gating signal relative to feedback and feedback_out potentials of the voltage feedback regulator.

FIG. 6A shows the relation between the feedback potential, the feedback_out potential and the clk_gate signal.

First, it is to be noted that the feedback potential (Vfeedback) is roughly a dropped copy of the high output voltage HV received by the voltage feedback regulator. Until HV reaches a sufficiently high voltage the feedback potential can be assimilated to zero. After, the feedback potential can be assimilated to a periodic graph with step by step increasing phases A which represent the active pumping stages of the charge pump and smoothly decreasing phases B which represent discharge of the HV voltage by a load.

If the feedback potential becomes higher than the threshold voltage Vt of the switching transistor, it means that the determined regulation voltage Vreg, which corresponds to the sum of the threshold voltage Vt and the dropped voltage Vzener, has been reached so the output voltage HV is sufficient and it does not need to be pumped up further. Then the switching transistor is in a conductive state. So, by applying Kirchoff's first law, the current at the input of the trigger changes sign and the feedback_out potential (Vfeedback_out) graph changes direction from increasing to decreasing.

Conversely, if the feedback potential becomes lower than the threshold voltage Vt of the switching transistor, it means that the determined regulation voltage Vreg has not been reached so the output voltage HV needs to be pumped up. Then the switching transistor is in a non conductive state. So, by applying Kirchoff's first law again, the current at the input of the trigger changes sign and the feedback_out potential graph changes direction from decreasing to increasing.

As shown in FIG. 6A, feedback_out voltage varies within a voltage range defined by a maximum level, for example Vdd=3V, and a minimum level, for example Vss=0V. The feedback_out voltage exhibits decreasing and increasing slopes according to whether or not switching means 106 is activated, these decreasing and increasing slopes being determined by the current supplied by the current source 109 and the current consumed by the current sink 107.

Furthermore, switching between decreasing and increasing slopes is determined by feedback voltage being above or under threshold voltage Vt.

This feedback_out potential controls the input of the trigger. The trigger has two different threshold voltages, a low one Vl_t and a high one Vh_t. If Vfeedback_out becomes lower than the low threshold voltage Vl_t, the clk_gate signal changes level from high to low. If the feedback_out potential becomes higher than the high threshold voltage Vh_t, the clk_gate signal changes level from low to high.

Finally, the clk_gate signal controls the clock signal given to the charge pump. So, if clk_gate is at the high level, the charge pump boosts up the output voltage HV and consequently the feedback potential increases. And if clk_gate is at the low level, the clock is gated off and the charge pump is in a standby state.

It is to be noted that the gating signal which controls the activation and deactivation of the charge pump circuit, depends on the characteristics of the switching transistor and of ratio between the current sinks. This determined ratio allows determined voltage rise and fall times of feedback_out node 108. These controlled rise and fall times prevent oscillations in the feedback loop.

These variations in Vfeedback control the state of the switching transistor as mentioned hereinbefore. Thus, the regulation feedback loop is closed.

Figure 6B:
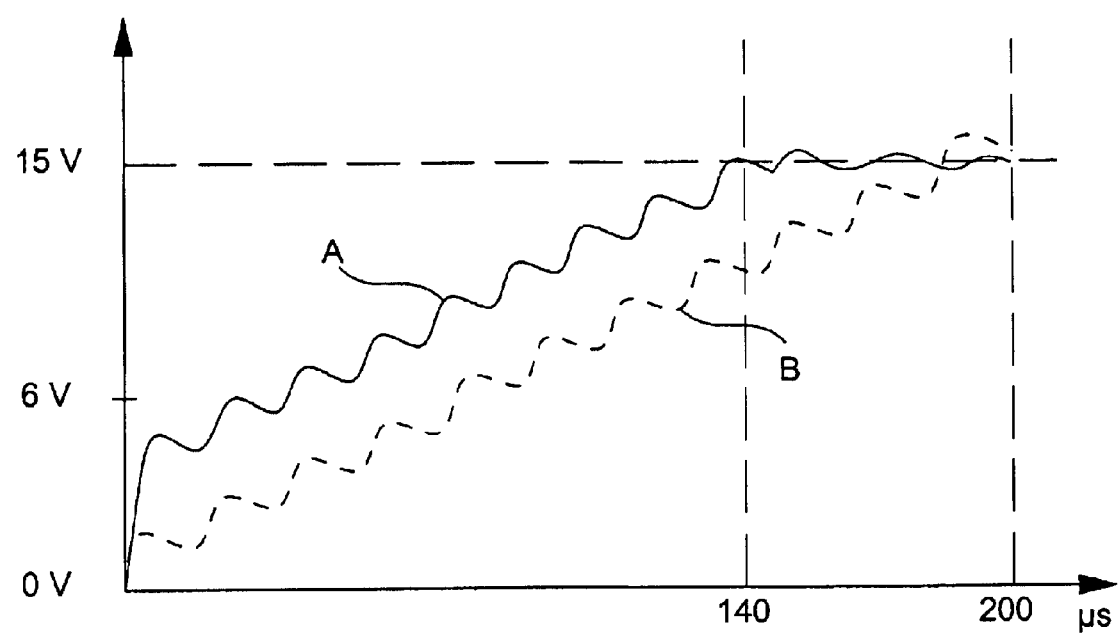
FIG. 6B, is the evolution of the output voltage during the start of the charge pump when using ramp rate control means.

FIG. 6B shows the controlled ramp of the output voltage using simple ramp rate control means, and the controlled ramp of the output voltage using ramp rate control means according to a preferred embodiment of the invention.

The graph B shows the output voltage when the ramp rate control means are immediately efficient. In this case, the ramp rate control means only comprises a capacitor.

In the preferred embodiment using an added transistor 114 corresponding to graph A, the ramp rate of the output voltage is controlled as soon as the added transistor is in a conductive state. Before being in a conductive state the added transistor is in a non conductive state and the ramp control means are inefficient. Thus, the rising time is shortened.

Figure 7:
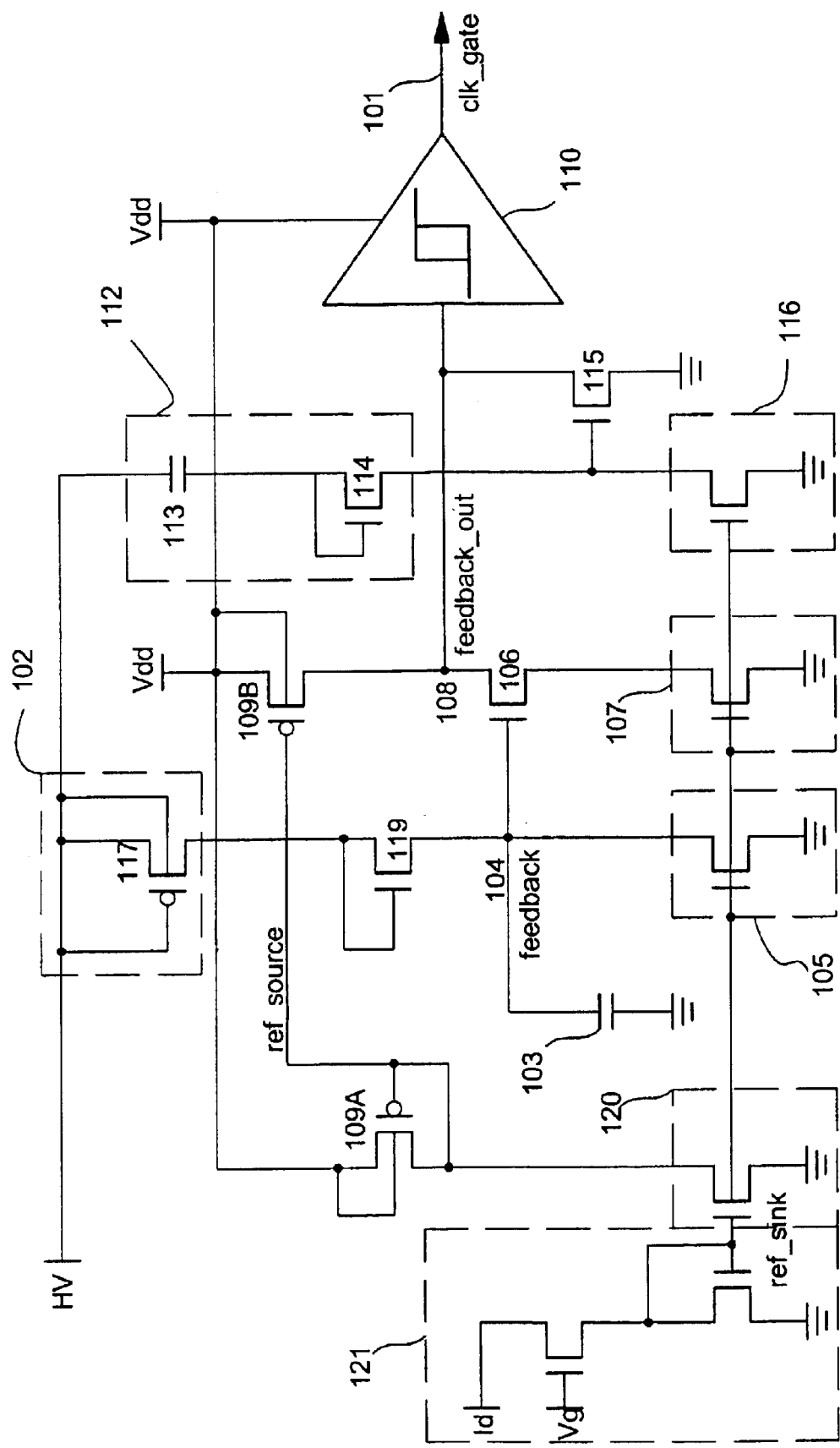
FIG. 7, is a detailed schematic diagram of the voltage feedback regulator according to the preferred embodiment of the invention.

FIG. 7 shows the detailed structure of the voltage feedback regulator. The complete regulator of FIG. 5 is represented with the same reference numerals.

The dropping voltage means are composed of a PMOS transistor 117 which form a Zener diode 102 in breakdown mode and possibly of an additional dropping transistor 119, if necessary.

The current source 109 is defined by the reference gate voltage for current source ref_source and the transistors T109A and T109B. The different current sinks 105, 107, 116 and 120 are defined by the reference gate voltage for current sink ref_sink and a structure of transistors T105, T107, T116 and T120 disposed so as to form current mirrors with the current source 121. The current source 121 delivers the desired current at the entrance of the different current mirrors. The different transistor sizes allows the current ratio of the mirrors to be determined.

Thus the current mirrors are adjusted so to have the same current flowing in the current sinks or source 105, 109 and 120. The current flowing in the current sink 107 is adjusted so to be two times bigger than the aforementioned current. The current flowing in the current sink 116 can be independent from the aforementioned currents.

Figure 8:
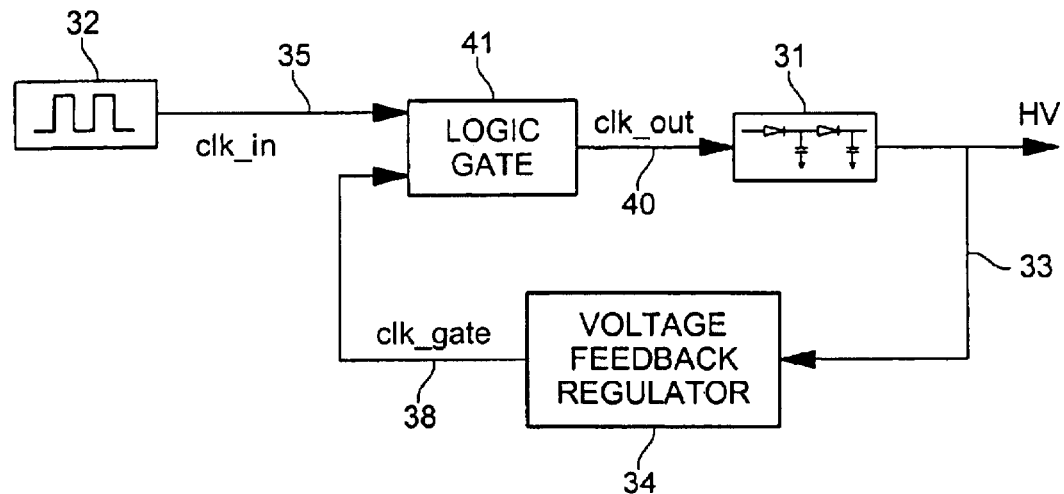
FIG. 8, is a block diagram of a voltage multiplier circuit with a feedback loop according to another embodiment of the invention.

FIG. 8 shows the invention according to another embodiment. The reference numerals correspond to the references in FIG. 3.

The voltage multiplier circuit shown uses different means for gating the clock signal 35 of the oscillator 32. The means used are a simple logic gate 41 which receives two entries, the clk_in signal 35 and the gating signal 38 which is furnished by the voltage feedback regulator 34.

Figure 9:
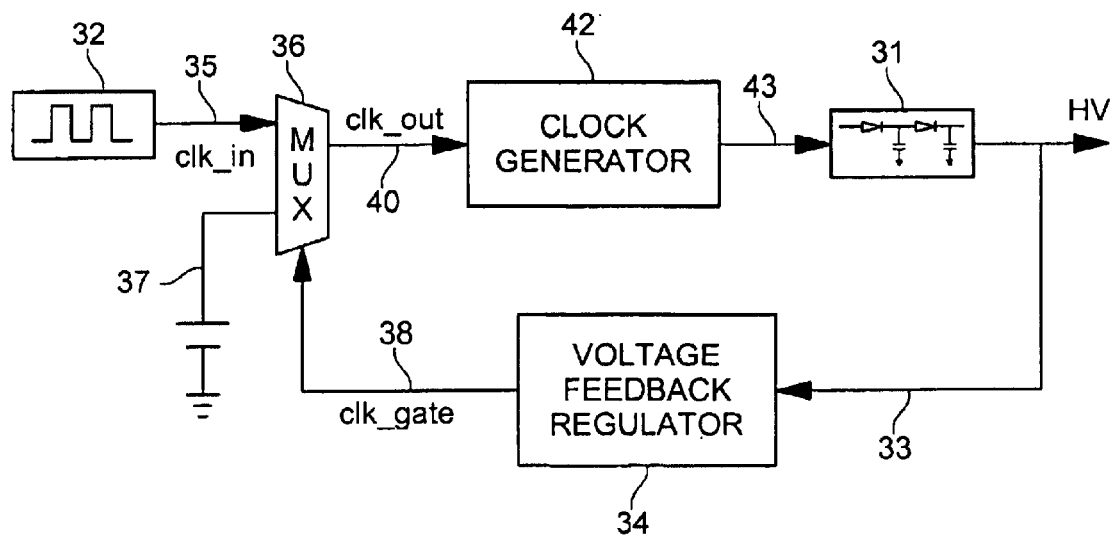
FIG. 9, is a block diagram of a voltage multiplier circuit with a feedback loop using biphased clock signals according to the invention.

FIG. 9 shows an embodiment using a multiphase clock according to the invention. The reference numerals correspond to the references in FIG. 3.

The clk_out signal 40 is received by a clock generator 42 which uses in particular inverters to divide the incoming clk_out signal into a multiphase clock signal 43. This kind of multiphase clock allows the different stages of the charge pump to be controlled more precisely.

It is to be noted that this description mentions the use of MOS transistor technology, but it is also possible to use some others transistor technologies such as bipolar transistors or junction transistors.

A filter (not represented) such as the one presented with FIG. 3, can be added to both embodiments of FIGS. 8 and 9.

It is also to be noted that this description mentions the generation of positive high voltage, but it is also possible to generate medium level voltages or negative voltages using the same clock gating feedback technique.

It is understood that the above described embodiment is merely illustrative of the many possible specific embodiments which can represent principles of the present invention. Numerous and varied other arrangements can readily be devised in accordance with these principles by those skilled in the art without departing from the scope and spirit of the invention.

What is claimed is:

1. A voltage multiplier circuit, in particular for programmable memories, said multiplier circuit being supplied by a low voltage and including:

an oscillator for generating a clock signal;

a charge pump circuit controlled on the basis of said clock signal in order to generate a high output voltage;

a regulation feedback loop including a feedback circuit connected to the output of said charge pump circuit; and means for gating said clock signal, which is disposed in said feedback loop between said oscillator and said charge pump circuit, said means being controlled by a gating signal supplied by said feedback circuit, said feedback circuit comprising means for generating, on the basis of said high output voltage, an intermediate control voltage which varies within a determined voltage range defined by minimum and maximum voltage levels, wherein said minimum and maximum voltage levels are independent of said high output voltage and wherein said means for generating the intermediate control voltage include control means, for gradually increasing or respectively decreasing said intermediate control voltage within said voltage range in response to said high output voltage being above or respectively under a determined voltage level.

2. The voltage multiplier circuit according to claim 1, wherein said minimum and maximum voltage levels are first and second reference potentials of said voltage multiplier circuit.

3. The voltage multiplier circuit according to claim 1, wherein said control means include a switching means controlled on the basis of said high voltage output and having a first terminal connected to a current source delivering a first current and a second terminal connected to a current sink consuming a second current greater than said first current, said intermediate control voltage being supplied at said first terminal.

4. The voltage multiplier circuit according to claim 3, wherein said first and second currents have a determined ratio equal to two.

5. The voltage multiplier circuit according to claim 3, wherein said feedback circuit further includes voltage dropping means for supplying a dropped voltage for controlling said switching means.

6. The voltage multiplier circuit according to claim 5, wherein said feedback circuit further includes a stabilization capacitor at the output of said dropping means.

7. The voltage multiplier circuit according to claim 1, wherein said feedback circuit further includes digitising means which is an hysteresis trigger having first and second threshold voltages within said voltage range.

8. The voltage multiplier circuit according to claim 1, wherein said high output voltage is filtered using a transistor with a low threshold voltage.

9. The voltage multiplier circuit according to claim 1, wherein said clock signal gating means comprise a multiplexer receiving said clock signal from said oscillator and a DC supply voltage, both received signals being controlled by said gating signal in order to let one pass, the output of the multiplexer being connected to said charge pump circuit.

10. The voltage multiplier circuit according to claim 1, wherein said feedback circuit further includes ramp rate control means.

11. The voltage multiplier circuit according to claim 10, wherein said ramp rate control means includes a capacitor connected to the high output voltage and a controlled current supply disposed between said capacitor and an output of said control means.

12. The voltage multiplier circuit according to claim 11, wherein said ramp rate control means further includes switching means in series with said capacitor.

* * * * *